Oct. 28, 1941.   B. C. PLACE   2,260,690

FASTENER

Filed Jan. 4, 1939

Inventor
Bion C. Place
By Strauch & Hoffman
Attorneys

Patented Oct. 28, 1941

2,260,690

UNITED STATES PATENT OFFICE 2,260,690

FASTENER

Bion C. Place, Detroit, Mich., assignor of one-half to George E. Gagnier, Detroit, Mich.

Application January 4, 1939, Serial No. 249,289

1 Claim. (Cl. 189—88)

The present invention involves a fastener of the one-piece type constructed from untempered or soft metal so as to be capable of ready deformation in order to complete the connection of parts by means of the fastener. More particularly, the present invention involves a deformable fastener especially shaped to secure light metal hollow moldings to an apertured metal part of a structure such as an automobile or like body.

It has been heretofore proposed to secure moldings to automobile bodies or parts by means of deformable fasteners, but fasteners so used have not been entirely satisfactory, because, in the operation of deforming the fastener to complete the connection of the molding and the body or part, all looseness between the molding and the fastener, and between the fastener and the automobile part or body was not eliminated. As a consequence the moldings were not retained from movement and squeaks were liable to develop when the automobile was subjected to vibrations incident to its operation.

The primary purpose of the present invention is to provide a simple one-piece deformable fastener so constructed that, when it is deformed in the expected manner, all play or looseness between the fastener and the part or body and between the fastener and the molding is eliminated.

A further object of the invention is to provide a fastener for securing moldings having a deformable stud part associated with a head part in such manner that deformation of the stud part, to take up any looseness between said part and the structure to which the molding is applied, results in a simultaneous alteration in the form of the head part to insure an absence of looseness between the latter part and the molding.

A still further object of the invention is to provide a novel method of attaching moldings to apertured structures.

This invention also aims to provide a deformable fastener, capable of being constructed from a simple blank of sheet metal, without substantial waste of metal.

A further object of the invention is to provide an improved association of molding apertured structure and deformable fastener.

Further objects of the invention will appear as the description thereof proceeds with reference to the acompanying drawing in which.

Like reference characters indicate like parts throughout the several figures.

Figure 1:
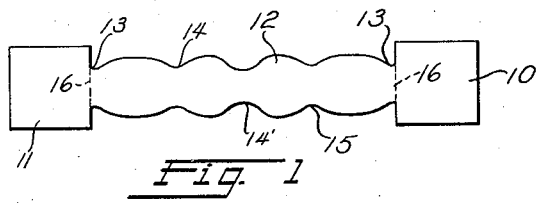
Figure 1 is a plan view of the blank from which the preferred form of fastener of the present invention is constructed.

The blank from which the preferred form of fastener is constructed, illustrated in Figure 1, comprises a strip of untempered steel or like metal of elongated form, the strip being of approximately the same width from end to end in order to avoid waste of material. The blank consists of end portions 10 and 11 that are wider than the mid portion 12 of the strip. The mid portion of the strip is reduced in cross section adjacent the end portions as indicated by 13 and also at three further points along the length of the strip as indicated at 14, 14' and 15.

Figure 2:
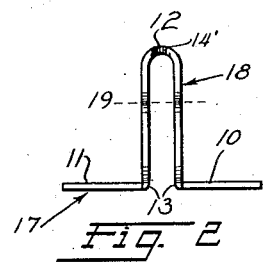
Figure 2 is a side elevational view of the preferred form of fastener of the present invention ready for insertion in the molding and association with the structure to which the molding is to be applied.

In order to bring the fastener to the form preferred for assembly with respect to the molding and the structure to which the molding is secured, the mid portion of the fastener is bent into U-shaped form as illustrated in Figure 2, the wider end portions being related to the legs of the U formation by right angular bends made on the dotted lines indicated by 16 on Figure 1. The resultant fastener consists of a head part indicated as a whole by the numeral 17 and a stud part as a whole by 18. The head part comprises the two wide end portions 10 and 11 of the blank while the stud part consists of the mid portion of the blank. Each leg of the stud part is of reduced cross-sectional area adjacent the head part and on the plane indicated by the dotted line 19 in Figure 2. Inasmuch as the fastener is constructed of soft and untempered metal, it is capable of being readily deformed in a manner presently to be described.

The fastener just described is especially designed for securing hollow holdings such as the molding, designated as a whole by 20, to a structure designated as a whole by 21, the latter structure having aligned apertures 22 designed to receive the fasteners which attach the molding 20 thereto. Molding 20 is of conventional form and includes inturned flanges 23 and 24 spaced from the body of the molding. The body of the molding may assume any desired shape. Frequently the molding is semi-round or of the character selected for illustration in the drawing.

Figure 3:
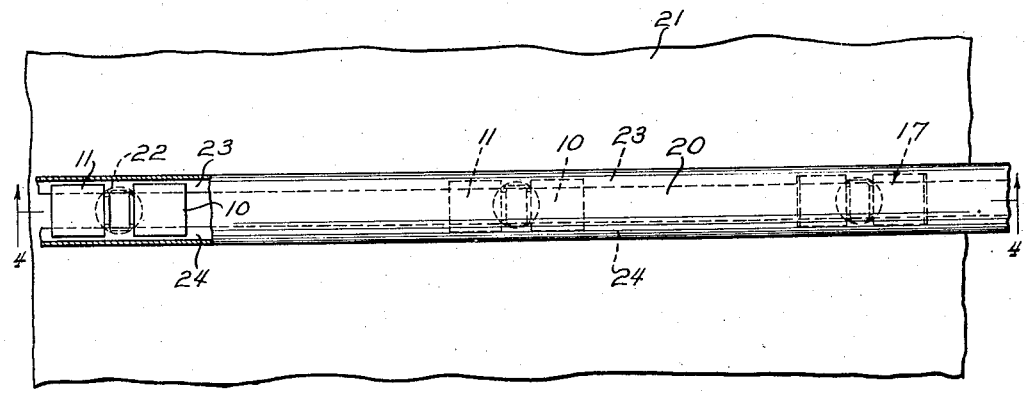
Figure 3 is a fragmentary plan view of a section of hollow molding applied to a support, a part of the molding being broken away to show the relation of the fastener to the support.

In securing the molding 20 to the support 21, a number of fasteners are first inserted in the hollow molding by sliding them from the open end of the molding to the desired position along the length thereof at which an opening will be located when the molding, with the fasteners protruding therefrom, is brought in position on the structure to which the molding is to be attached. In assembling the fasteners with respect to the molding, the head portions 10 and 11 bridge the gap between the flanges 23 and 24 and substantially lap said flanges interiorly of the molding. The stud part 18 protrudes through the gap between the flanges of the molding, as illustrated in the central part of Figures 3 and 4, which show the fastener in position in the molding after it has been slid to the proper position along the length thereof.

Figure 4:
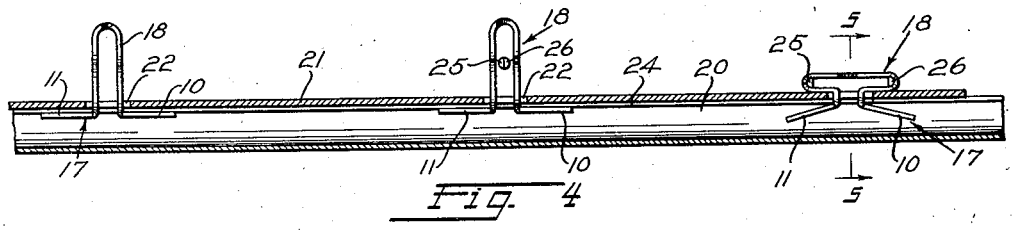
Figure 4 is a longitudinal section through the molding and fasteners included in Figure 3.

After the requisite number of fasteners have been assembled with the molding, the protruding stud parts of the fasteners are entered into the openings or apertures 22 of the structure 21. The attachment of the molding to the structure 21 is then completed in the following manner:

A tool, such as a pair of pliers having jaws provided with pointed and rounded noses, is entered between the legs of the U-shaped stud part at the mid portion thereof as illustrated in the central part of Figure 4 of the drawing in which 25 and 26 indicate the ends of the pair of rounded jaws or noses of the pliers. The jaws of the pliers are then opened expanding the stud part of the fastener to the form illustrated at the right of Figure 4. The weakening of the stud part, by reducing the cross-sectional area at 14, 14' and 15 the points at which said part is bent when during expansion in the manner just stated, insures that the bending is properly localized thus producing an elongated symmetrical loop illustrated at the right of Figure 4.

Figure 5:
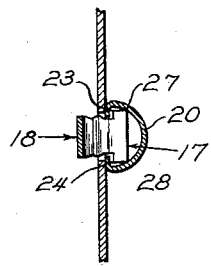
Figure 5 is a transverse sectional view taken in the plane indicated by the line 5—5 in Figure 4 looking in the direction of the arrow.

In expanding the stud part 18 by separating the legs of the U-formation in the manner just described, the head portions 10 and 11 are caused to assume the angular position illustrated at the right of Figure 4, said head portions moving as the stud part is expanded until they contact with the top wall of the molding as clearly illustrated at 27 and 28 in Figure 5. Of course, if the top wall is flat the head portions 10 and 11 will bear against the entire width thereof rather than only at spaced points 27 and 28.

Considerable pressure is exerted opening the pliers so as to draw the legs of the U-formation into firm contact with opposite walls of the openings 22. Of course, if the openings 22 are circular as illustrated, the contact will be spaced points at each side of the opening. Accordingly, there will be no looseness between the portion of the stud part that passes through the opening 22 and the structure 21, and since the head portions 10 and 11 extend from the flanges to the wall opposite and are firmly pressed against the latter wall in the course of the expansion of the stud part of the fastener in the manner already described, the head part will retain the molding from lateral movement with respect to the structure against which it bears, the molding being held from movement away from the said structure because of the fact that in expanding the stud part the widened head portions are drawn into firm contact with the molding flanges 23 and 24, as will be obvious. The head portions of the fastener will be so designed that when the fastener is in its deformed condition illustrated at the right of Figure 4, the corners of said widened head portions bear yieldingly but firmly against the top wall of the molding. Accordingly, regardless of such slight manufacturing variations in the interior shape of the molding as actually occur in practice, the head portions of the fastener will bear firmly against the molding wall, thus insuring an absence of looseness at these points. In view of the engagement of the head part with the top wall of the molding the latter cannot shift laterally with respect to the fasteners, thus making it unnecessary that the stud parts of the fastener be constructed to snugly fit between the flanges of the molding. In actual practice it is difficult to obtain a snug fit at this point because of manufacturing variations in the spacing of the flanges, and it is undesirable to provide a snug fit because resistance is then provided to the free shifting of the fasteners endwise of the molding to bring them into position.

Figure 6:
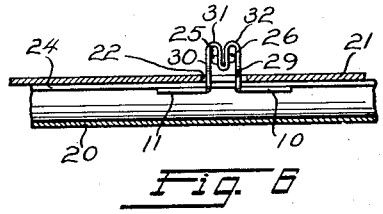
Figures 6 and 7 are sectional views showing a modified form of fastener securing a hollow molding to a supporting structure, Figure 6 showing the fastener prior to deformation and Figure 7 showing the fastener in its final or holding position.
Figure 7:
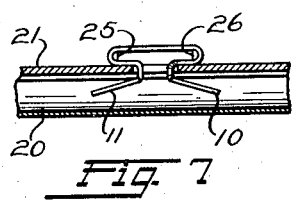

In the modified form of fastener illustrated in Figures 6 and 7, the stud part is initially bent to provide spaced parallel portions 29 and 30 corresponding to the legs of the inverted U-shaped stud part first described. The parallel portions 29 and 30 are connected by a pair of connected inverted U-shaped portions 31 and 32. Figure 6 illustrates the modified fastener assembled with respect to the molding and with the stud part passed through an opening 22 of the structure 21. The head portions 10 and 11 which are the same as the like portions of the fastener first described engaging the flanges 23 and 24 of a hollow molding 20 of exactly the same shape as that illustrated in connection with the fastener first described.

The connection of the molding 20 to the structure 21 is effected by a suitable expanding tool having parts 25 and 26 inserted within the hollow stud portion in contact with the parallel portions 29 and 30. When the tool portions 25 and 26 are forcibly separated the holding portion of the fastener is brought into the position illustrated in Figure 7 which includes an elongated loop of the character already described and in which the head portions extend from the flanges to the wall of the molding opposite, all possible looseness between the fastener, the molding and the structure being taken up during the expansion of the stud part of the fastener.

It will be understood that if desired the elongated loop formed by the expansion of the stud part of the fastener may be flattened by a suitable tool to minimize the protrusion of the stud part of the fastener beyond the inner surface of the structure 21. Such flattening of the elongated loop when used has no effect on the connection provided by the fastener.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In combination, a supporting structure having an opening, a hollow molding having incurned flanges disposed on said structure over said opening, and a deformable fastener securing said molding to said structure consisting in a strip of metal having wide end portions disposed within said molding in lapped relation to its flanges, narrower intermediate portions extending between said flanges and expanded into firm contact with opposite side walls of said opening, and a further intermediate portion consisting in an expanded elongated loop pendent from said intermediate portions and having a width substantially exceeding the spacing of said side-walls, said end portions each extending angularly from opposite sides of said opening and away from said flanges to the inside of the top wall of said molding.

BION C. PLACE.